United States Patent Office 3,521,055
Patented July 21, 1970

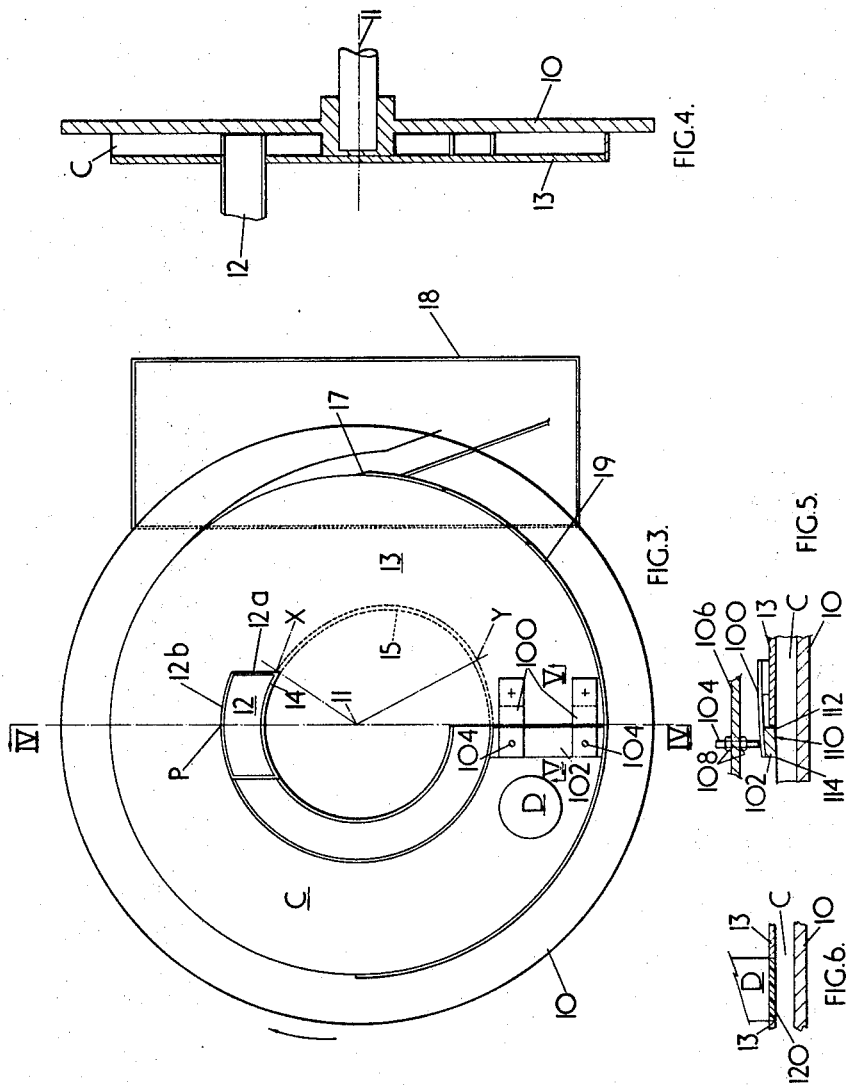

---

3,521,055
APPARATUS FOR USE IN DETERMINING THE CHARACTER OF FINELY DIVIDED OR PARTICULATE SOLID MATERIAL
Arthur A. Hirst, Ashby-de-la-Zouch, and Kenneth W. Daykin, Mackworth, England, assignors to Coal Industry (Patents) Limited, London, England
Filed May 15, 1967, Ser. No. 638,280
Claims priority, application Great Britain, June 10, 1966, 26,013/66; Jan. 17, 1967, 2,470/67
Int. Cl. G01n 23/12
U.S. Cl. 250—43.5                                             10 Claims

---

ABSTRACT OF THE DISCLOSURE

The apparatus presents solid particulate material to a beam of electro-magnetic radiation to test a characteristic of the material. Material leaving a delivery station is deposited on a rotary table and deflected so as to avoid the delivery station as it moves round on the table, the deflection of the material displacing previously deposited material towards a position in which the previously deposited material is discharged from the table. The apparatus enables results to be obtained for successive samples in serial fashion, results from one sample being for the most part unaffected by the presence of material from a previous sample.

---

This invention relates to apparatus for presenting particulate solid material to a beam of electro-magnetic radiation to determine a characteristic of the material to a beam of electro-magnetic radiation to determine a characteristic of the material, for example the ash content of coal, by measuring the amount of radiation back-scattered or absorbed by the material.

In using irradiating beams for sampling purposes it is desirable to obtain several values for a given sample free from material from another sample so that a reliable average value of the characteristic can be obtained.

It is known to present material, e.g. fine coal, to an electro-magnetic radiation beam by means of a horizontal rotary table having means for arranging the material on the table in a flat elongated layer of uniform depth. However, in such apparatus, material already on the table returns past the delivery station and mixes with further material issuing from the delivery station. This has the disadvantage that in every test sample there is always material present from earlier samples and therefore the results at any instant are not representative of the material actually being delivered to the table at that instant.

The present invention avoids this disadvantage by deflecting material leaving the delivery station so that newly delivered material is deposited alongside previously deposited material.

Figure 1:
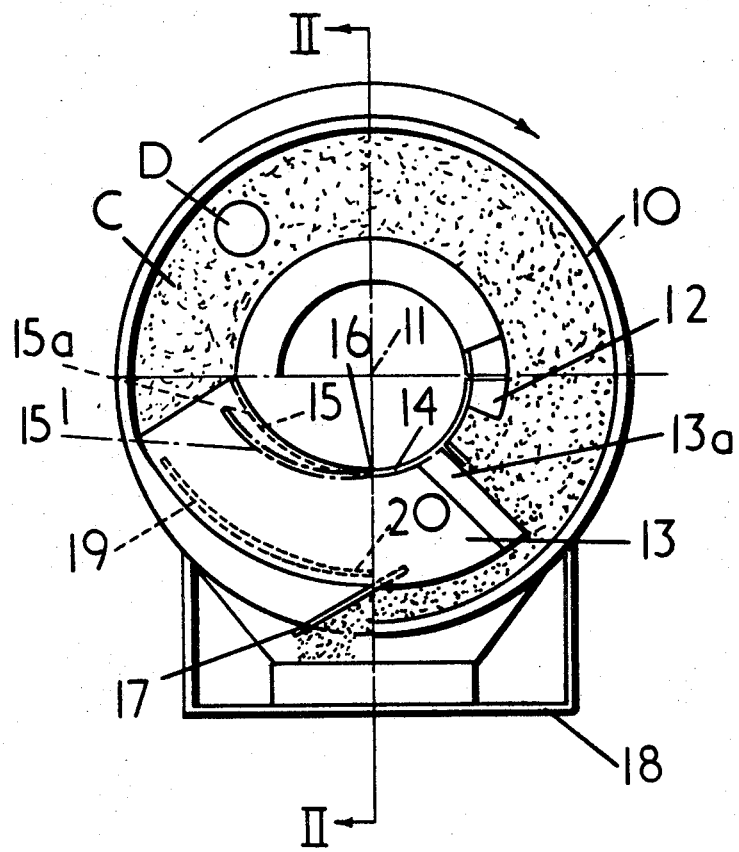
Figure 2:
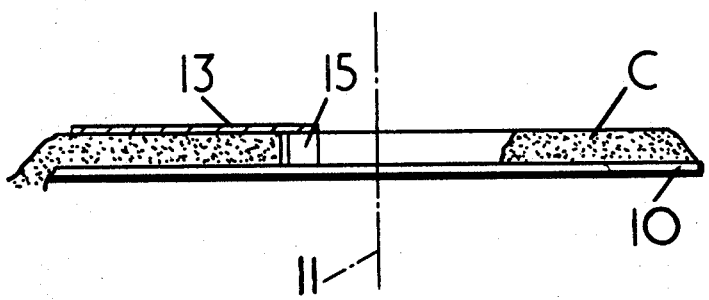

The invention is described by way of example with reference to the accompanying drawings in which:

FIG. 1 is a schematic plan of one form of apparatus;
FIG. 2 is a vertical section on the line II—II in FIG. 1;
FIG. 3 is a plan of another form of apparatus;
FIG. 4 is a vertical section on the line IV—IV in FIG. 3; and
FIG. 5 is a section on the line V—V in FIG. 3;
FIG. 6 is a scrap vertical section through the detector means to show a further modification.

FIGS. 1 and 2 show a horizontal circular table 10 rotatable about a vertical axis 11 in the direction of the arrow by suitable drive means (not shown).

Material, for example fine coal, whose ash content is to be determined, is delivered onto the table by a feed chute 12 and, after being formed into a flat elongated layer C of substantially uniform width and depth in a manner to be described, is carried beneath a combined electro-magnetic radiation beam emitter detector D, the beam irradiating the upper surface of the layer C. The amount of radiation back-scattered from the sample is detected and provides a signal representative of the ash content.

The chute 12 is arranged so that new material to be sampled is deposited on the table 10 at a location radially inwardly of the previously formed and sampled layer C so that the new material forms a radially inner band immediately adjacent to the layer C. After deposition on the table 10, the new material together with the previously formed layer is carried by the table below a stationary horizontal levelling plate 13 extending angularly through approximately 120 degrees and having a width radially of the circular table 10 approximating to the required width of layer C. The plate 13 occupies a height above the table 10 corresponding to the desired depth of layer C and has an upwardly directed entry 13a to assist passage of material below plate 13.

Extending adjacent the radially-inner edge of and below the plate 13 is a stationary vertical boundary wall having a fixed curved portion 14 concentric with the circular table 10, and a curved adjustable deflector arm 15, constituting a continuation in the direction of rotation of the table 10 of the wall portion 14. The end 15a of arm 15 remote from chute 12 defines the radially inner lateral boundary of the layer C.

The arm 15 is eccentric relative to table 10 and projects into the path of any new material delivered onto the table, the arm 15 and the outer periphery of the table 10 converging in the direction of rotation of the table so that the trailing end 15a of arm 15 relative to the direction of rotation of table 10 is located at the same radius as that of the radially outer side wall of the chute 12. The arm 15 is pivotable at its leading end about a vertical axis 16 and may be secured, for example, in a position shown by chain line 15′ according to the feed rate of material.

As table 10 rotates, new material deposited on the table is engaged by arm 15 and is displaced together with the layer C bodily and outwardly from the centre of the table by a distance corresponding to the width of chute 12, the plate 13 preventing the material from sliding upon itself and thus ensuring that the new material does not mix with the previously deposited material but forms, a distinct radially inner zone.

The outer lateral boundary of the layer C is determined by a stationary upstanding plate 17 which is adjustably mounted radially outwardly of the axis 16 and which projects obliquely across the table 10 to terminate in an inner edge spaced outwardly of the wall 14, 15 by a distance equal to the desired width of layer C. Thus, as the layer C rotates and is deflected from the centre upon introduction of new material through chute 12, the plate 17 removes from the layer C a radially-outer zone of material corresponding to the quantity of new material introduced into the layer C. Removed material falls from table 10 into a discharge hopper 18.

Material to be sampled may be delivered continuously through the chute 12 at a uniform or variable rate, or the feed may be intermittent. With continuous feed the material will normally be subjected to several scans by the irradiating beam emitted by the sensing head before being discharged from the table 10, the number of scans depending on the feed rate and rotary speed of the table.

If the feed is interrupted, material will remain on the table and will continue to pass in an undisturbed manner through the irradiating beam thereby preventing the occurrence of misleading deviations in the signals obtained from the detector D.

The maximum rate at which new material is delivered to the table 10 so that it can all pass below plate 13 depends on the rotational speed of the table and the degree of eccentricity of arm 15. If the feed rate is above this maximum, the surplus may be prevented from passing radially inwardly of the plate 13 by suitable upstanding plating (not shown), the surplus then moving radially outwardly off the table 10 into the hopper 18. Alternatively, the chute 12 may be provided with a by-pass for excess material (not shown).

If the material has not been finely ground, it may be advantageous to provide an upstanding wall in the form of a springloaded arm 19 extending beneath plate 13 and pivotable about a vertical pivot 20, the arm 19 having a compression spring (not shown) which opposes outward movement of the arm and urges the arm inwardly against a stop (not shown). The arm 19 thus serves to compact material carried beneath plate 13 and to ensure a uniform, flat upper surface on layer C. It may also be necessary to provide the surface of the table 10 with cross slats, vanes, studs or like projections to prevent the material from slipping, these projections being arranged so that they do not interfere with the outward movement of layer C.

FIGS. 3 to 5 show a horizontal circular table 10 rotatable about a vertical axis 11 in the direction of the arrow by suitable drive means (not shown).

Material to be sampled is delivered onto the table 10 by a feed hopper 12 and, after being formed into a flat elongated layer C of substantially uniform width and depth, is carried below the emitter detector D as in the first embodiment.

Material passes from the hopper 12 through an opening at the base of a side wall 12a which opening continues in the form of a slot at the base of an outer side wall 12b, the latter slot extending as far as P (FIG. 3). The inner wall 14 of hopper 12 extends as a deflector below plate 13 in the form of a wall section 15, increasing in radius from leading end X to trailing end and thereafter follows a circular path concentric with table 10. When material passes through the slots in the walls 12a and 12b material already on the table 10 is displaced outwardly by the deflector 15, the radially outermost layer being diverted by the leading edge 17 of wall 19. The material remaining on table 10 is compacted between wall 19 and deflector 15, the latter two parts gradually converging together beneath a horizontal levelling plate 13.

The compacted layer C passes beneath the device D and the wall 19 is continued beyond this point to reduce any tendency of the surface layer to crack whilst beneath the device D. After the required determination has taken place the outer edge of material is allowed to fall away.

The wall 19 is formed of a plurality of over-lapping sections which can be removed as desired to increase or decrease the area over which compaction of the material takes place.

FIG. 5 shows details of the trailing end of plate 13 which has secured to it by flexible, resilient arms 100 a trimmer bar 102. The free condition of the arms 100 is flat but they can be pressed downwardly into the position shown by screws 104 supported in a support member 106 (not shown, for clarity, in FIG. 3) and each having two lock-nuts 108. By adjustment of the screws 104 the position of the bar 102 can be adjusted so that the final depth of the layer C can be accurately determined. The inclined underside 110 of bar 102 can also give the material in the layer C a final slight compaction, the leading edge 112 of the underside being slightly higher than the trailing edge 114. The trimmer bar 102 is optional and may be omitted.

The plate 13 is preferably arranged so that its leading end is slightly higher above the plate 10 than its trailing end so that the material in the layer C is subjected to progressive compaction as table 10 rotates. In practice, the difference in height between the two ends may be very small, e.g. 1/16 in.

In either of the two embodiments described above and particularly where very penetrating radiation is used, a plate member 120 (FIG. 6) transparent to radiation, may be interposed between the detector D and material C. This plate may form part of the means determining the depth of material on the table (for example part of the plate 13, see FIG. 6). The plate member ensures that the upper surface of the material, as it passed the detector, is as flat and uniform as possible which is of particular advantage for coarse material. It also helps to eliminate bubbles on the upper surface of wet material and assists in the avoidance of dust effects, the passage of material in engagement with the window keeping this relatively clean.

The plate 13 acts both to determine the depth of material on the table and, in conjunction with the table and the deflector wall and outer wall 19, to compact the material so that the detector is presented with a surface which is uniform and truly representative of the sample beneath the detector.

If the feed to the table is interrupted, the signal recorded by the detector means D continues to indicate, for example, the ash content of a coal sample delivered to the table immediately before the interruption; it may be desirable to provide means to indicate that during a period of "no-feed" such recordings should be ignored, or, alternatively, if the signal is used for automatic control, or for computing average ash content, to initiate appropriate action in the recording, control or computation systems. This is important where the apparatus is used for testing a succession of different samples or for the continuous examination of samples of, for example, a coal as produced.

Moreover, as the introduction of a new sample causes the displacement of the preceding sample apart from a transistory determination (which could, with suitable timing of the means D in relation to the introduction of the new sample, be eliminated) measurements on a new sample are not affected by the presence of material from the preceding sample.

The apparatus is simple and rapidly forms a suitable layer for examination. The arrangements for compacting the layer can deal with moist material which tends to crumble and ensure that a compact layer free from discontinuities is presented automatically to the emitter-detector.

We claim:
1. Apparatus for determining a characteristic of particulate solid material comprising a table mounted for rotation and having an upper surface on to which the material can be supplied, delivery means for delivering material on to said upper surface, radiation emitter means arranged above said upper surface, radiation detector means arranged above said surface, a deflector arranged to deflect material from said delivery means radially so that the material subsequently avoids said delivery means and in turn displaces adjacent material towards a position in which said adjacent material may be discharged from said table, and means operable, as material passes, to determine the depth of said material.

2. Apparatus according to claim 1, in which the means for determining the depth of material comprises a plate arranged above the upper surface of the table and in which the deflector lies at least partly beneath the plate.

3. Apparatus according to claim 1, in which the means for determining the depth of material on the table comprises a member having an underside spaced from the upper surface of the table, the underside having a leading edge, relative to the direction of rotation of the table, which is higher above the table than the trailing edge.

4. Apparatus according to claim 3, in which the member is a plate arranged above the upper surface of the table and in which the deflector lies at least partly beneath the plate.

5. Apparatus according to claim 1, in which the means for determining the depth of material comprises adjustable means by which the depth of material can be altered.

6. Apparatus according to claim 5, in which the means for determining the depth of material comprises a plate arranged above the upper surface of the table, and in which the deflector lies at least partly beneath the plate, and in which the adjustable means is provided beyond the trailing edge of the plate, relative to the direction of rotation of the table.

7. Apparatus as claimed in claim 1, in which the delivery means is arranged in a radially inward position relative to the table and in which the deflector has a trailing end, relative to rotation of the table, radially outwardly displaced relative to its leading end.

8. Apparatus according to claim 2, in which the deflector is curved and presents a convex face to material which it deflects.

9. Apparatus according to claim 1, in which a member made of material transparent to radiation is interposed between said table and said detector means and engages said material on said table as said material passes said detector means.

10. Apparatus according to claim 9, in which said member forms part of said means to determine the depth of said material.

References Cited
UNITED STATES PATENTS 2,914,676   11/1959   Dijkstra et al.
2,958,777   11/1960   Sieswerda et al.

ARCHIE R. BORCHELT, Primary Examiner

U.S. Cl. X.R.

250—83.3